3,514,302
REFRACTORY COMPOSITIONS
Tracy A. Willmore and Alfred W. Allen, Urbana, Ill., assignors to AMSTED Industries Incorporated, Chicago, Ill., a corporation of New Jersey
No Drawing. Filed Apr. 27, 1967, Ser. No. 634,135
Int. Cl. C04b 35/44, 35/48
U.S. Cl. 106—57          4 Claims

ABSTRACT OF THE DISCLOSURE

Magnesia or zirconia, or combinations of both, are used as addition agents to stoichiometric or non-stoichiometric magnesium aluminate to provide a ceramic body exhibiting high strength qualities at elevated temperatures.

---

This invention relates to refractory compositions that exhibit high strength qualities at elevated temperatures and more particularly to magnesium aluminate-base refractory compositions containing additives of magnesia, zirconia, or combinations thereof.

The development of new and superior metallurgical processes often creates an accompanying demand for an improved refractory material that is compatible with such processes. Generally desirable properties of refractories include good corrosion resistance and thermal shock characteristics. More importantly, the development of new iron and steel melting and casting processes has increased the demand for refractory materials exhibiting relatively high strength characteristics at temperatures up to 1600° C.

For example, in the Pat. 3,302,252 to Woodburn, an apparatus for continuous casting is described employing a vertical pouring tube through which molten steel is forced by superatmospheric pressure from a ladle into a mold. Due to the nature of this process, the pouring tube must be composed of a refractory capable of withstanding high transverse stresses at the casting temperature of steel, which is in the neighborhood of about 1400° to 1600° C. Other metalurgical processes similarly require refractory compositions of varying forms that exhibit such properties.

While it is known to use spinel or magnesium aluminate as a refractory material, it has also been found that ceramic bodies prepared from spinel alone are unsuitable in applications requiring high strength characteristics at elevated temperatures. In order to overcome this deficiency, it has been discovered that additions of magnesia or zirconia, or combinations thereof to the spinel, will greatly improve the high temperature strength characteristics of this material. As will be hereinafter more fully explained, it has been found that up to 60 percent of the refractory composition may comprise addition agents of zirconia or magnesia, or combinations thereof, with magnesia additions of up to 15 percent and zirconia additions of up to 50 percent, the remainder consisting of stoichiometric or non-stoichiometric magnesium aluminate.

The magnesium aluminate may be produced by sintering or fusing magnesium oxide with aluminum oxide or by many of the other well known methods. Both sintered and fused magnesium aluminate have been used with good success, although the fused material has been found superior in some applications.

Also, magnesia or alumina rich magnesium aluminate may be beneficially employed, such material being produced by fusing or sintering non-stoichiometric quantities of magnesia or alumina. In the practice of the present invention, it has been found that up to about 38 percent of the magnesium aluminate may consist of magnesia to produce a magnesia-rich material. In the alternative, up to about 78 percent of the magnesium aluminate may consist of alumina to produce an alumina-rich spinel, it being understood that stoichiometric magnesium aluminate ($MgAl_2O_4$)

consists of about 28.2 percent magnesia and 71.8 percent alumina.

The relative amounts of zirconia or magnesia to be added to the thus prepared spinel has not been found to be critical. Weight percentages of from 0.5 to 50 percent zirconia and from 0.5 to 15 percent magnesia have been employed with success, although additions of about 3 to 10 percent of either alone or about 2 to 8 percent of both are normally sufficient to achieve the desired benefit. Stabilized or unstabilized zirconia may be used, and, preferably, the magnesia is lightly calcined.

The refractory body may be prepared by any convenient method of mixing the magnesium aluminate with one or more of the additives, and thereafter pressing, ramming, or casting the mixture into the desired shape, followed by firing at a temperature of about 1600° C. Other temporary bonding agents may also be added to the mixture to provide sufficient green strength for handling. If magnesia is used as an additive, a magnesium oxychloride solution has been found to be a suitable cold bonding agent.

The mixture employed to produce the fired refractory body is preferably composed of grain sizes which produce dense-packing mixes when compacted. One mixture that has been successfully employed consists of about 45 percent by weight coarse (−8 +20 mesh) grain, 15 percent intermediate (−20 +65 mesh) grain and 40 percent fine (−65 mesh) grain, with the magnesia and zirconia being substituted for an equivalent amount of the fine fraction.

In order to further illustrate the present invention, the following examples are given:

EXAMPLE 1

Hot transverse strength tests were performed on various magnesium aluminate bodies containing minor additions of magnesia and zirconia. In substantially all compositions, the grain size was adjusted to 45 percent coarse (−8 +20 mesh), 15 percent intermediate (−20 +65 mesh), and 40 percent fine (−65 mesh), the magnesia or zirconia being substituted for an equivalent amount of the fines.

The fine fraction was then mixed with an auxiliary bonding agent before the addition of the intermediate and coarse fractions, in order to provide sufficient green strength for handling. If the body was to contain magnesia, then magnesium oxychloride solution was used as a temporary bonding agent. All other mixes were bonded with an aqueous solution of Carbowax 4000.

The resulting mixtures were pressed in a hydraulic press at 7500 p.s.i. to produce bars measuring about ½ by ½ by 6 inches. The bars were then fired in a kiln at 1600° C. for 5 hours.

An apparatus was constructed in order to determine the modulus of rupture at high temperatures. For this purpose, the specimen was supported near its edges within a furnace at the testing temperature. Load was applied to the bar by the use of a silicon carbide rod projecting through the roof of the furnace and connected to a load measuring apparatus. During each test, the load on the specimen was constantly increased until failure occurred.

Some results of tests on specimens using stoichiometric fused magnesium aluminate and minor amounts of magnesia and zirconia are indicated below:

| Weight percent composition of specimen | | | Modulus of rupture (p.s.i.) at 1,500° C. |
|---|---|---|---|
| Magnesium aluminate | Magnesia | Zirconia | |
| 100 | 0 | 0 | |
| 95 | 5 | 0 | 781 |
| 95 | 0 | 5 | 331 |
| 90 | 5 | 5 | 2161 |

The strength of the body containing 100 percent magnesium aluminate was found to drop off sharply after being heated to 900° C., while the strength of the specimens containing 5 percent of either magnesia or zirconia alone, was found to begin declining at about 1200 to 1400° C.

EXAMPLE 2

Similar evaluations were made with respect to modified magnesium aluminate, based on the assumption that stoichometric magnesium aluminate contains 71.8 percent alumina and 28.2 percent magnesia. The process for making the specimens was the same as described in Experiment 1, except that the original fused or sintered spinel was rich in magnesia or alumina.

The results were similar to those stated in Example 1. All of the modified spinels without additives failed before reaching 1500° C. The modified spinels containing minor additions of magnesia or zirconia had relatively higher transverse strengths. For example, a modified spinel was prepared by fusing 69.8 percent alumina and 30.2 percent magnesia, to yield a spinel containing 20 percent excess magnesia. Thereafter, about 5 percent zirconia was added in the manner stated in Example 1. The resulting specimen, at 1500° C., was found to have a modulus of rupture of 995 p.s.i.

EXAMPLE 3

Other specimens were prepared to determine possible variations in hot strength properties by varying the relative amounts of additives to stoichiometric magnesium aluminate. The following illustrates some results of the tests conducted.

| Weight percent composition of specimen | | | Modulus of rupture (p.s.i.) at 1,500° C. |
|---|---|---|---|
| Magnesium aluminate | Magnesia | Zirconia | |
| 90 | 5 | 5 | 935 |
| 60 | 4 | 36 | 1,695 |
| 60 | 2 | 38 | 1,450 |
| 60 | 20 | 20 | 1,797 |
| 45 | 20 | 35 | 2,514 |
| 70 | 10 | 20 | 1,594 |
| 60 | 10 | 30 | 1,497 |

As may be seen, the relative amounts of additives may be greatly varied without adversely affecting the transverse strength properties of the compositions at high temperatures. The higher modulus of rupture values of this erample as compared to the values of Example 1 are believed partly attributable to the use of a different lot of fused magnesium aluminate.

Having thus described the invention, what is claimed is:

1. A refractory composition made up from a batch consisting essentially of separate additions of zirconia and a spinel, said zirconia being present in said batch in the amount of 0.5 to 50 percent, and the remainder of said batch being a spinel selected from a group consisting of stoichiometric magnesium aluminate, magnesia-rich magnesium aluminate containing up to 38 percent as magnesia, alumina-rich magnesium aluminate containing up to 78 percent as alumina, and mixtures thereof.

2. A refractory composition made up from a batch consisting essentially of separate additions of magnesia and a spinel, said magnesia being present in said batch in the amount of 0.5 to 15 percent, and the remainder of said batch being a spinel selected from a group consisting of stoichiometric magnesium aluminate, magnesia-rich magnesium aluminate containing up to 38 percent as magnesia, alumina-rich magnesium aluminate containing up to 78 percent as alumina, and mixtures thereof.

3. A refractory composition made up from a batch consisting essentially of separate additions of magnesia, zirconia and a spinel, said magnesia being present in said batch in the amount of 0.5 to 15 percent, said zirconia being present in said batch in the amount of 0.5 to 50 percent, and the remainder of said batch consisting of at least 40 percent of a spinel selected from a group consisting of stoichiometric magnesium aluminate, magnesia-rich magnesium aluminate containing up to 38 percent as magnesia, alumina-rich magnesium aluminate containing up to 78 percent as alumina, and mixtures thereof.

4. A refractory composition made up from a batch consisting essentially of separate additions of a spinel and at least one of the group consisting of magnesia, zirconia, and mixtures thereof, the permissible amount of magnesia in said batch being from about 0.5 to 15 percent and the permissible amount of zirconia in said batch being from about 0.5 to 50 percent, said spinel constituting the remainder of said batch in the amount of at least 40 percent and being selected from a group consisting of stoichiometric magnesium aluminate, magnesium-rich magnesium aluminate containing up to 38 percent as magnesia, alumina-rich magnesium aluminate containing up to 78 percent as alumina, and mixtures thereof.

References Cited

UNITED STATES PATENTS

| 2,618,566 | 11/1952 | Robinson | 106—62 |
| 2,805,167 | 9/1957 | McCreight et al. | 106—62 |
| 3,333,971 | 8/1967 | McKenna | 106—57 |

JAMES E. POER, Primary Examiner

U.S. Cl. X.R.

106—62